US006202950B1

(12) United States Patent
Hruska

(10) Patent No.: US 6,202,950 B1
(45) Date of Patent: Mar. 20, 2001

(54) CROP MATERIAL PROCESSOR WITH CONTROLLED DISCHARGE

(75) Inventor: Kevin Hruska, Gerald (CA)

(73) Assignee: Bridgeview Mfg. Inc., Gerald (CA)

( * ) Notice: Subject to any disclaimer, the term of this patent is extended or adjusted under 35 U.S.C. 154(b) by 0 days.

(21) Appl. No.: 09/312,570

(22) Filed: May 14, 1999

(30) Foreign Application Priority Data

Oct. 13, 1998 (CA) .................................................... 2250313
Oct. 15, 1998 (CA) .................................................... 2250612

(51) Int. Cl.$^7$ ................................................. B02C 13/286
(52) U.S. Cl. ................................. 241/189.1; 241/101.762; 241/285.3
(58) Field of Search ............................ 241/285.3, 285.2, 241/185.1, 194, 195, 101.76, 101.762, 101.763, 605

(56) References Cited

U.S. PATENT DOCUMENTS

| 4,448,361 | 5/1984 | Marcy . |
| 4,830,292 | 5/1989 | Frey . |
| 5,033,683 | 7/1991 | Taylor . |
| 5,090,630 | 2/1992 | Kopecky et al. . |
| 5,340,040 | 8/1994 | Bussiere et al. . |
| 5,601,241 | 2/1997 | Brewster . |
| 5,622,323 | 4/1997 | Krueger et al. . |

OTHER PUBLICATIONS

Advertisement "Model BP–25 Bale Processor" Hesston The Prime Line, Hesston Corporation.
Advertisement "Load and Feed Big Bales from Your Tractor or Pickup" DewEze Super Slicer, DewEze Mfg. Co.
Advertisement "Bale Processor" Vermeer Manufacturing Company.
Internet Advertisement "8610 Bale Processor" Case IH Agricultural Equipment.
Advertisement "EZ Feed 280" for Highline Mfg. Inc.
Advertisement "Bale Processor" from Jiffy by Westward Products Ltd.

Primary Examiner—Mark Rosenbaum
(74) Attorney, Agent, or Firm—Killworth, Gottman, Hagan & Schaeff, LLP

(57) ABSTRACT

A crop material processor for disintegrating baled crop material comprises a container, a disintegrator, means for manipulating the crop material for disintegration by the disintegrator and a discharge opening that is at the bottom of one of the side walls of the container. The crop material processor further includes a discharge door near the discharge opening. The discharge door can be pivotally positioned anywhere between extreme upper and lower positions to control the discharge of crop material. A controller for determining the position of the discharge door includes an actuator for moving the door, a mechanism such as a handle or motor for driving the actuator and a biasing spring for assisting in the movement of the actuator. The crop material processor may further include an adjustable deflector located at the bottom of the discharge opening.

17 Claims, 5 Drawing Sheets

CROP MATERIAL PROCESSOR WITH CONTROLLED DISCHARGE

FIELD OF THE INVENTION

The present invention relates generally to a crop material processor and more particularly to a crop material processor with controlled discharge of the disintegrated baled crop materials.

BACKGROUND OF THE INVENTION

Crop materials, such as straw, hay or other like forage, or animal bedding, are often baled for storage and transportation. In some instances, it is necessary to break the bale apart in order to spread the crop material for animal bedding or to dispense the crop material as feed.

A machine to disintegrate bales of crop material is sometimes known as a baled crop material processor. A typical machine is described in U.S. Pat. No. 4,830,292 which issued to Frey on May 16, 1989. A baled crop material processor basically comprises a container for receiving the bales, a disintegrator often in the form of a roller with cutters or flails for chopping or shredding the material from the bale, a mechanism including manipulator rollers to direct the bale to the disintegrator and a discharge slot such that the crop material is discharged from the bail processor. Any number of manipulator rollers are possible, however, the disintegrator is located between and below two of the manipulator rollers. The baled crop material is supported and rotated by the rollers. As the crop material bale rotates the disintegrator breaks apart the outer portion of the baled crop material first and then proceeds to break apart the crop material towards the centre of the bale until the crop material is completely broken apart. As the baled crop material is disintegrated, the loose crop material is driven by the flails to be discharged from the machine through the discharge slot. Usually, it is desired to use the discharged crop material as feed in the form of windrows or in feed bunks, or then again to use the discharged crop material as animal bedding which requires that it be scattered.

Often, the problem is to be able to control the discharge of the crop material for these different purposes in a machine. Known crop material processors often include a discharge door that must be partially dismantled to adjust the discharge of the crop material for forming windrows, for discharging into feed bunks or for scattering as animal bedding. This adjustment of the discharge door is not easy to use and therefore is a time consuming and strenuous work for the operator, particularly if he is working alone.

SUMMARY OF THE INVENTION

It is therefore an object of this invention to provide a baled crop material processor with a discharge control mechanism that adjusts the discharge of the disintegrated baled crop material from the processor.

These and other objects are achieved in a baled crop material processor for disintegrating baled crop material comprising a container for receiving and containing the crop material, the container having a bottom, a front wall, a back wall, a left side wall and a right side wall; a disintegrator mounted inside the container for disintegrating the baled crop material and discharging the disintegrated crop material from the processor; means for supporting and manipulating the crop material for disintegration primarily by the disintegrator; an opening at the bottom of one of the side walls through which the disintegrated crop material is discharged; a discharge door pivotally mounted adjacent to the discharge opening, the discharge door being pivotally positioned between extreme upper and lower positions for deflecting the crop material discharged from the discharge opening at an angle dependent on the positioning of the discharge door; and a controller for controlling the pivotal motion of the discharge door to define the deflection angle, of the discharged crop material.

In accordance with an aspect of the present invention, the controller comprises an actuator coupled to the discharge door for pivoting the discharge door and a driver mechanism coupled to the actuator for operating the actuator. The controller may further include a spring biasing mechanism coupled to the actuator to assist the driver in operating the actuator.

The actuator may comprise at least two flanges spatially mounted on the container, an axial member rotatably mounted between the flanges, at least two leverage members fixed to the axial member, at least two linking arms, each linking arm movably connected between one of the leverage members and the discharge door, and a clevis fixed to the axial member to impart a rotating motion to axial member by the driver.

With regard to another aspect of the invention, the driver may be a handle mounted on the clevis for rotating the clevis and openings spatially located on the flange to receive the handle to lock the clevis into position or alternately, the driver may be a hydraulic cylinder or an electric linear motor controlled by the operator.

In a further aspect of the present invention, the processor may include an elongated deflector pivotally mounted adjacent to the bottom of the discharge opening for assisting to direct the discharged crop materials. In addition, a flap may be mounted on the outside edge of the discharge door to further direct the discharging material. The flap is made from a pliable and yet durable material such as rubber.

In accordance with another aspect of the present invention, the deflector and the discharge door may be linked together to operate in unison either being raised and lowered together or in opposite directions. In addition, the upper position of the discharge door is such that it does not contribute to the overall width of the processor.

BRIEF DESCRIPTION OF THE DRAWINGS

Embodiments of the invention are described in conjunction with the drawings in which.

DETAILED DESCRIPTION OF THE DRAWINGS

Over the years a number of bale processors have been developed for disintegrating bales of crop materials and spreading the shredded materials either as bedding or as feed. Various forage crop materials such as hay or straw from different crops may be made into bales that are small or large, rectangular or round. Most processors have been designed to be pulled by a tractor, however, this need not be the case as others have been mounted on trucks, for example. Also it is usual to use the power take-off and the hydraulics from the tractor to operate the crop material processors.

Figure 1:
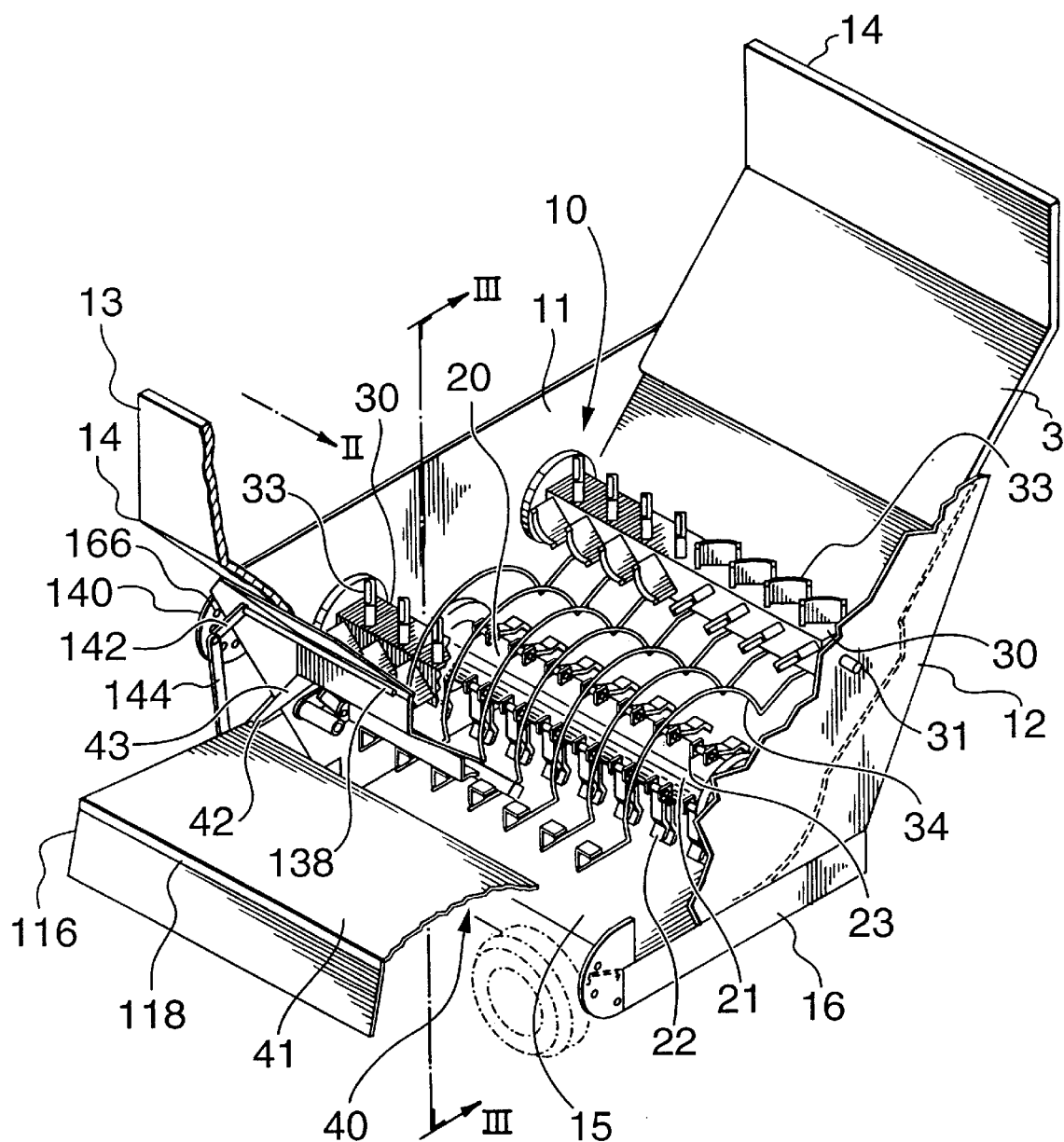
FIG. 1 is an isometric view of an embodiment of the invention.
Figure 2:
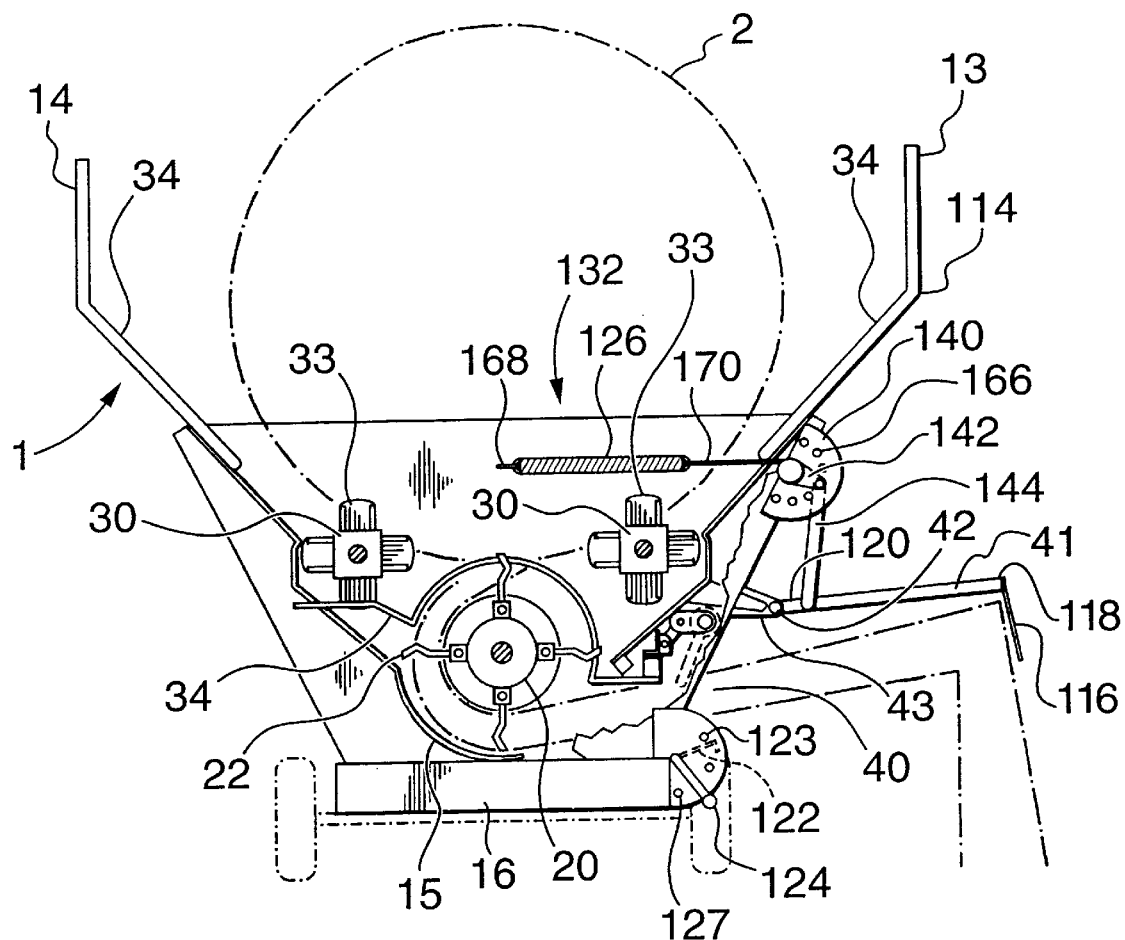
FIG. 2 is a cross-sectional view of the embodiment shown in FIG. 1 taken in the direction indicated by II.

FIGS. 1 and 2 illustrate one of a variety of baled crop processors which may be used in conjunction with the present invention. The baled crop material processor 1 includes a bale container 10 into which bales 2 as shown schematically in FIG. 2 of crop material are placed. The container is fixed to a chassis 16. The bale container 10 further has a front wall 11, a back wall 12, two sidewalls 13, 14 and a base 15 which extends from wall 14 under the container 10.

A disintegrator 20 is mounted within the container 10 parallel to the side walls 13 and 14. The disintegrator 20 includes a flail roller 21 connected to a power take-off coupler located on the container 10 wall 11. The roller 21 rotates about its longitudinal axis. The disintegrator 20 also includes a plurality of flails 22 intermittently spaced circumferentially and longitudinally about the roller 21. The flails 22 extend radially from the flail roller 21 and are connected to the roller 21 by pivots 23.

The bale processor 1 further includes a combination of mechanisms for manipulating the bale and directing it to the disintegrator 20 such that the bale remains generally intact for disintegration primarily by the disintegrator 20. The combination of mechanisms includes at least a pair of rollers 30, each roller 30 mounted parallel to and between the disintegrator 20 and a side wall 13 or 14 respectively. Each roller 30 is also mounted on bearings 31 between the end walls 11 and 12 at a location higher than the disintegrator 20 and near the side wall 13, 14. The rollers 30 in combination with the walls 13, 14 define a support surface on which the bale of crop material is supported. Outside of the container 10 on wall 11, each roller 30 is connected to a hydraulic motor for rotating the roller 30 in either direction as desired by the operator. The rollers 30 further include paddles 33 spaced circumferentially and longitudinally along the rollers 30. The paddles 33 project outwardly from the rollers 30. The spacing between the two rollers 30 defines a disintegration opening 32 where the bale encounters the disintegrator 20.

The walls 13 and 14 together with the rollers 30 support the bale within the container 10 as the rollers 30 rotate the bale. While the bale rotates, the rotating flails 22 on the flail roller 20 grasp some of the crop material on the bale, effectively disintegrating the bale.

Also mounted inside the container 10 is a series of hoops 34 which prevent the bale or bundles of loose crop material from dropping into the disintegrator 20 all at once. The hoops 34 are mounted between the sidewalls 13 and 14 of container 10.

Figure 3:
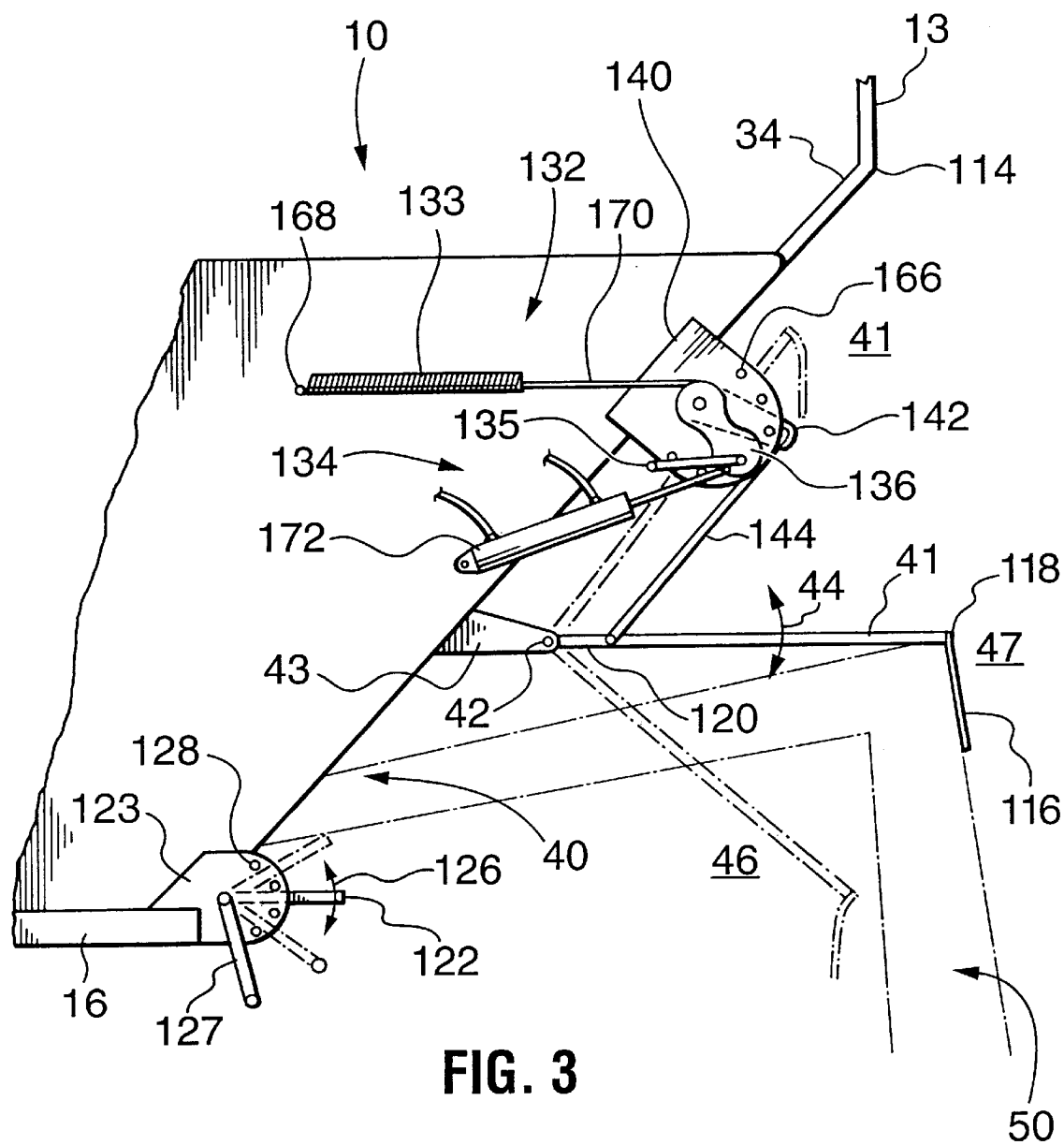
FIG. 3 is a side view of the control mechanism in accordance with the present invention.
Figure 4:
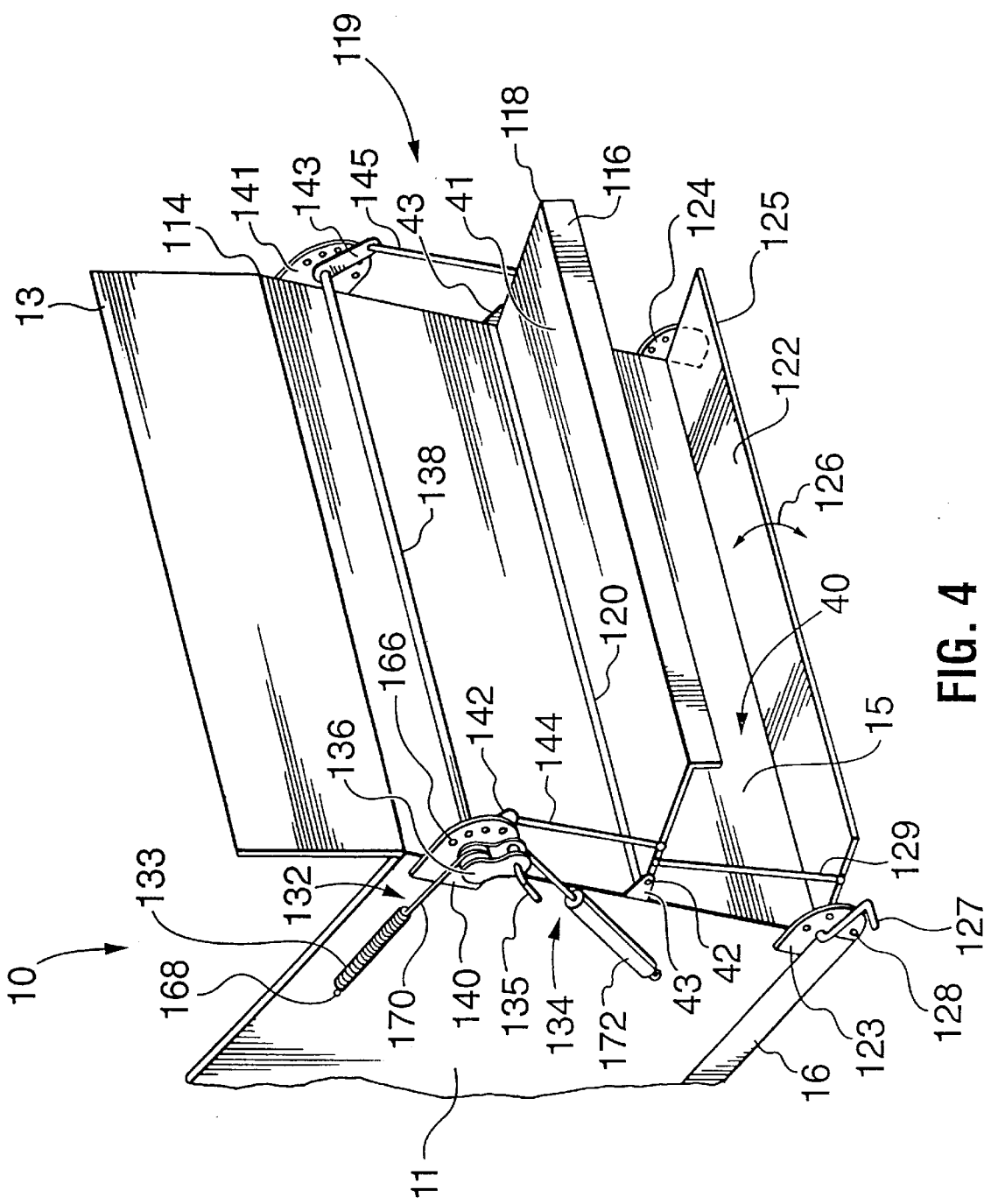
FIG. 4 is an isometric view of the control mechanism illustrated in FIG. 3.
Figure 5:
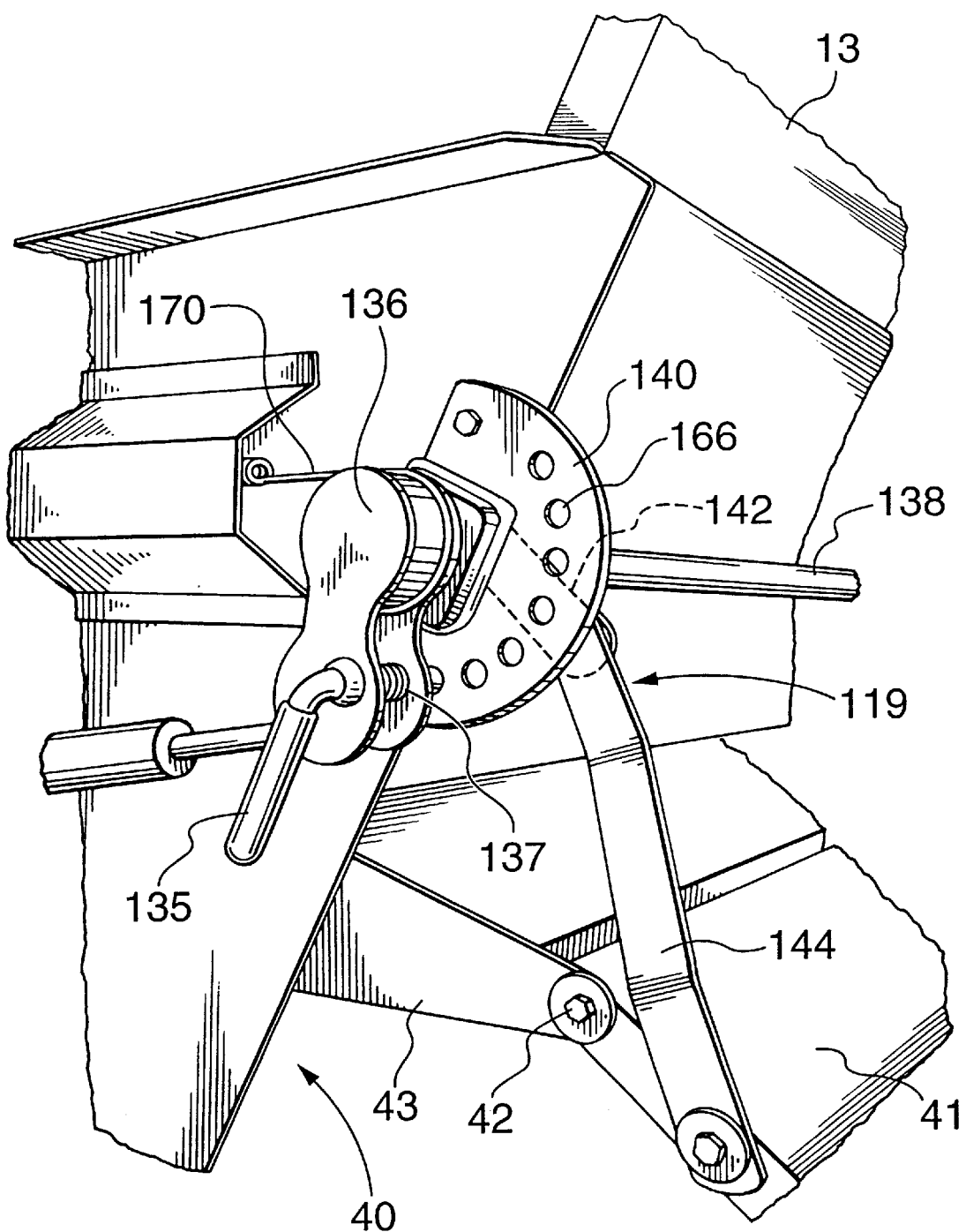
FIG. 5 is an isometric view of a portion of the control mechanism illustrated in FIG. 4.

As illustrated in FIGS. 1 and 2 in conjunction with FIGS. 3, 4 and 5, a discharge opening 40 is formed by wall 13, the base 15 and the end walls 11 and 12. Discharge opening 40 is located at the bottom of the side wail 13 of container 10 through which the flails 22 on the flail roller 20 drive the shredded crop material to discharge it from the processor 1. In addition, a discharge door 41 is hinged at 42 to an extension 43 from the side wall 13 such that it may be raised or lowered as shown by arrow 44 to guide the shredded bale material as it is discharged. When the discharge door 41 is in the upper position 45, the discharged material 50 will be spread over a wide area; when the discharge door 41 is in the lower position 46, the discharged material 50 will form a windrow as the machine 1 moves; and when the discharge door 41 is in an intermediate position 47, the discharged material 50 can be directed into a feed bunk.

A portion 34 of the sidewalls 13, 14 of the container 10 is sloped outwardly from the centre of the container 10, the portion 34 of sloped sidewall 13 has a top edge 114, the width of the container at this point defines the overall width of the processor 1. When the discharge door 41 is in its extreme upper position 45, it is preferred that it does not extend out further than the top edge 114 of sidewall 13 of the container 10. In this way, the discharge door 41 does not add to the processor 1 width for passing through gates or narrow passages.

In addition, the discharge door 41 may include a flap 116. The flap 116 is mounted on the distal edge 118 of the discharge door 41 relative to the edge 120 of the discharge door 41 that is pivotally mounted on extensions 43. Preferably, the flap 116 is made of a flexible durable material such as rubber and will help to direct the disintegrated crop material downward.

In addition to the discharge door 41, a deflector 122 may be mounted at the bottom of the discharge opening 40. Deflector 122 is an elongated plate with one edge mounted at each end in flanges 123 and 124 that are fixed to end walls 11 and 12 respectively. Deflector 122 is pivotally mounted such that its outer edge 125 may be raised or lowered as illustrated by arrow 126 to partially deflect the crop material being discharged from the processor 1. A deflector handle 127 is fixed to the deflector 122 to adjust the position of the deflector 122. Handle 127 is spring loaded such that it may be locked into place at any one of a plurality of openings 128 located at discrete locations in flange 123.

To spread straw to a maximum distance from the processor 1, deflector 122 would be in a raised position when discharge door 41 is in a raised position, however for more even spreading of the straw over an area close to the processor 1, the deflector would be in the lowered position when discharge door 41 is in a raised position. To deflect the crop material downward into windrows the door 41 is lowered and as the deflector 122 is lowered, the windrow is formed closer to the processor 1. The deflector 122 mechanism may be linked to the discharge door 41 actuator mechanism 119 by a linkage 129 to operate in unison either to be raised and lowered together as shown in FIG. 4 or to move in opposite directions.

To operate the raising and lowering of the discharge door 41, the processor 1 includes three main mechanisms, an actuator 119, a biasing mechanism 132 and a mechanism 134 for driving the actuator 119. In one embodiment of the invention the actuator 119 comprises a clevis 136, an axial member 138, a pair of flanges 140, 141, a pair of leverage members 142, 143 and a pair of linking arms 144, 145. The pair of flanges 140, 141 are fixed to the end walls 11 and 12 respectively of the container 10 and are adapted to receive the axial member 138 so that the axial member 138 is free to rotate about its longitudinal axis. The pair of leverage members 142, 143 are fixed to the axial member 138 near the flanges 140, 141 respectively. The clevis 136 is also fixed to the axial member 138, but on the opposite side of the flange 140 from the leverage member 142. The linking arms 144 and 145 are connected between the leverage members 142 and 143 respectively and the discharge door 41.

The driving mechanism 134 may consist simply of a handle 135. The handle 135 may also be spring 137 loaded such that the end of the handle can be pushed into one of the series of openings 166 in the flange 140 to lock the discharge door into one of a plurality of discrete positions between its extreme upper and lower positions.

The biasing mechanism 132 facilitates the raising of the discharge door 41 by placing a counter-force on it. In this particular embodiment the biasing mechanism 132 comprises a spring 133 that is fixed at one end 168 to end wall 11 of the container 10. The other end of the spring is fixed to the clevis 136 by a cable 170. The cable is wrapped around the clevis 136 about its rotating axis such that the spring 133 aids the operator to raise discharge door 41 using the handle 135 and prevents the weight of the door 43 from causing it to drop uncontrollably when the operator wishes to lower the door.

In another embodiment of the invention, the driving mechanism 134 for the discharge door actuator 119 may comprise a hydraulic cylinder or an electric reversible linear motor 172 illustrated in FIGS. 4 and 5. The hydraulic cylinder or electrical motor 172 is anchored to the wall 11 at one end and to the clevis 136 at the other end to control the position of the discharge door 43. The hydraulic cylinder or electric motor allows the operator to place the discharge door 41 at any position that is desired between the extreme upper and lower positions whereas the manual control with the handle 135 only allows for certain set positions. In the case, where control of the discharge door positioning is carried out by the operator on the tractor, the spring loaded handle 135 will be disabled.

Many modifications to the above described embodiments of the invention can be carried out without departing from the scope thereof, and therefore the scope of the present invention is intended to be limited only by the appended claims.

What is claimed is:

1. A crop material processor for disintegrating baled crop material comprising:
   a container for receiving and containing the crop material, the container having a bottom, a front wall, a back wall, a left side wall and a right side wall;
   a disintegrator mounted inside the container for disintegrating the baled crop material and discharging the disintegrated crop material from the processor;
   means for supporting and manipulating the crop material for disintegration primarily by the disintegrator;
   an opening at the bottom of one of the side walls through which the disintegrated crop material is discharged;
   a discharge door pivotally mounted adjacent to the discharge opening, the discharge door being pivotally positioned between extreme upper and lower positions for deflecting the crop material discharged from the discharge opening at an angle dependent on the positioning of the discharge door; and
   a controller for controlling the pivotal motion of the discharge door to define the deflection angle.

2. A crop material processor as claimed in claim 1, wherein the discharge door is pivotally mounted to the side wall of the container above the discharge opening.

3. A crop material processor as claimed in claim 1, wherein the pivotal motion of the discharge door is assisted by a biasing member.

4. A crop material processor as claimed in claim 1, further comprising a flap mounted on the distal end of the discharge door relative to the pivotally mounted end of the discharge door.

5. A crop material processor as claimed in claim 4, wherein the flap is rubber.

6. A crop material processor as claimed in claim 1, further comprising an elongated deflector pivotally mounted adjacent to the bottom of the discharge opening.

7. A crop material processor as claimed in claim 1, wherein the controller comprises:
   an actuator coupled to the discharge door for pivoting the discharge door;
   driving means coupled to the actuator for operating the actuator.

8. A crop material processor as recited in claim 7, wherein the actuator comprises:
   at least two flanges spatially mounted on the container;
   an axial member rotatably mounted between the at least two flanges,
   at least two leverage members fixed to the axial member;
   at least two linking arms, each linking arm movably connected between one of the leverage members and the discharge door; and
   a clevis fixed to the axial member to impart a rotating motion to said axial member by the driving means.

9. A crop material processor as recited in claim 8, wherein the driving means comprises:
   a handle mounted on the clevis for rotating the clevis; and
   openings spatially located on one of the at least two flanges to receive the handle to lock the clevis in position.

10. A crop material processor as recited in claim 8, wherein the driving means comprises an electric linear motor mounted between the container and the clevis for rotating the clevis.

11. A crop material processor as recited in claim 8, wherein the driving means comprises a hydraulic cylinder mounted between the container and the clevis for rotating the clevis.

12. A crop material processor as claimed in claim 8, wherein the controller further comprises biasing means coupled to the actuator to assist the driving means in operating the actuator.

13. A crop material processor as claimed in claim 12, wherein the biasing means comprises:
   a spring having a first end fixed to the container and a second end; and
   a cable having a first end fixed to the spring second end and a second cable end wrapped about the clevis to provide rotational bias to the clevis.

14. A crop material processor as claimed in claim 7, wherein the controller further comprises biasing mean coupled to the actuator to assist the driving means in operating the actuator.

15. A crop material processor as claimed in claim 7, further comprising an elongated deflector pivotally mounted adjacent to the bottom of the discharge opening.

16. A crop material processor as claimed in claim 15, further comprising means for linking the elongated deflector to the actuator means to rotate the deflector and the discharge door in unison.

17. A crop material processor as claimed in claim 1, wherein
   a portion of each sidewall of the container is sloped outwardly from the centre of the container to determine the overall width of the processor; and
   the discharge door in the upper position is within the overall width of the processor.

* * * * *